(12) United States Patent
Medin et al.

(10) Patent No.: US 6,272,012 B1
(45) Date of Patent: Aug. 7, 2001

(54) SYSTEM AND METHOD FOR COOLING COMPACT PCI CIRCUIT CARDS IN A COMPUTER

(75) Inventors: David T. Medin, Marion; John Bodensteiner, Cedar Rapids, both of IA (US)

(73) Assignee: Crystal Group Inc., Hiawatha, IA (US)

( * ) Notice: Subject to any disclaimer, the term of this patent is extended or adjusted under 35 U.S.C. 154(b) by 0 days.

(21) Appl. No.: 09/498,238

(22) Filed: Feb. 3, 2000

(51) Int. Cl.⁷ ....................................................... H05K 7/20
(52) U.S. Cl. ........................... 361/690; 361/685; 361/717; 361/724; 165/104.26; 165/104.33; 174/16.1
(58) Field of Search .......................... 361/683, 687–695, 361/727, 752, 756, 796, 800, 802, 753, 799, 736, 740, 741, 825, 826, 829, 724; 174/35 R, 51, 16.1, 35 MS; 454/184; 211/41.17, 41, 46; 312/223.1, 223.2; 165/80.3, 104.33, 104.34, 104.24, 104.26

(56) References Cited

U.S. PATENT DOCUMENTS

| | | | |
|---|---|---|---|
| 4,277,815 | * | 7/1981 | Skroupa .............................. 361/383 |
| 4,672,509 | * | 6/1987 | Speraw ................................ 361/384 |
| 4,730,233 | * | 3/1988 | Osterman ............................ 361/383 |
| 4,739,444 | * | 4/1988 | Zushi et al. .......................... 361/383 |
| 4,866,576 | * | 9/1989 | Umetsu et al. ...................... 361/429 |
| 5,210,680 | * | 5/1993 | Scheibler ............................. 361/384 |
| 5,528,455 | * | 6/1996 | Miles ................................... 361/688 |
| 5,638,259 | * | 6/1997 | McCarthy et al. .................. 361/800 |
| 5,684,674 | * | 11/1997 | Yin ....................................... 361/695 |
| 5,995,368 | * | 11/1999 | Lee ....................................... 361/695 |
| 6,047,836 | * | 4/2000 | Miles ................................... 211/41.17 |

FOREIGN PATENT DOCUMENTS

| | | | |
|---|---|---|---|
| 2537295A1 | * | 4/1976 | (DE) ................................ H05K/7/20 |
| 2613366A1 | * | 10/1977 | (DE) ................................ H05K/7/20 |

* cited by examiner

Primary Examiner—Leo P. Picard
Assistant Examiner—Michael Datskovsky
(74) Attorney, Agent, or Firm—Simmons, Perrine, Albright & Ellwood, PLC

(57) ABSTRACT

A cooling system for use with compact PCI circuit cards in a computer, where the system includes an array of removable individual airflow-restricting panels disposed beneath the circuit cards. The panels having airflow characteristics which are matched to the circuit cards disposed immediately above, so as to control the volume of airflow across a particular circuit card, depending upon its individual cooling needs.

2 Claims, 2 Drawing Sheets

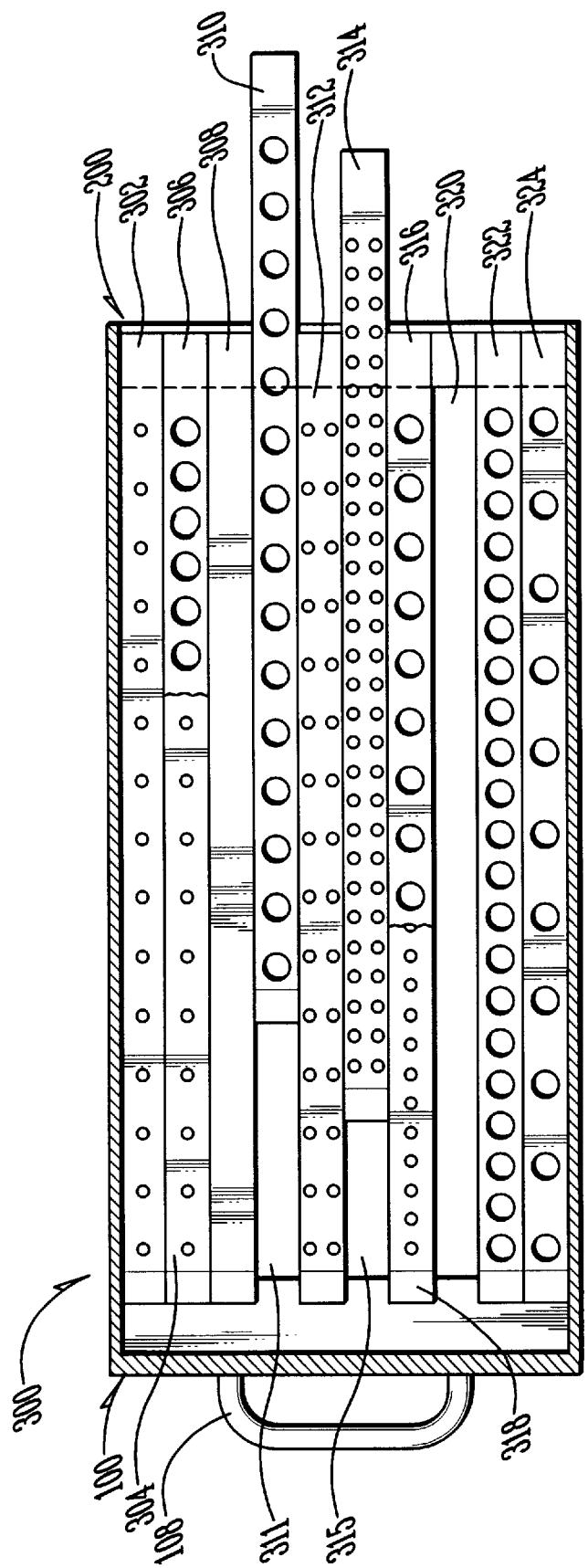

SYSTEM AND METHOD FOR COOLING COMPACT PCI CIRCUIT CARDS IN A COMPUTER

FIELD OF THE INVENTION

The present invention generally relates to computers, and more particularly relates to cooling systems and methods for use in personal computers, and even more particularly relates to a system and method for controlling airflow over compact PCI cards in a computer.

BACKGROUND OF THE INVENTION

In the past, designers of computing systems have endeavored to provide systems with increased reliability. One successful approach has been to include fans in the PC chassis to move air across the circuit cards therein. It has been a common practice in the industry to respond to higher heat-producing circuit cards by including higher powered fans which are capable of moving a larger overall volume of air through the chassis.

While these systems and methods have many advantages, they also have significant drawbacks.

First of all, the use of high-power fans often results in an undesirable increase in ambient sound levels, especially when numerous computers are in close proximity to each other, such as in a rack.

Secondly, high-powered fans typically consume valuable space inside the computer; this is especially troublesome when a compact computer design is desired.

Thirdly, larger and larger electric motors to drive the high-powered fans often generate an increased level of electrical noise on the computer's power bus, such that additional remedial measures are required.

Consequently, there exists a need for improvement in systems and methods for controlling airflow over circuit boards in personal computers.

SUMMARY OF THE INVENTION

It is an object of the present invention to provide enhanced reliability of personal computers.

It is a feature of the present invention to include a relatively small cooling fan in association with airflow-controlling members in the personal computer.

It is an advantage of the present invention to eliminate the undesirable requirement that larger cooling fans are needed to effectively cool a personal computer, which has at least one high density and high heat-generating circuit card therein.

The present invention is an apparatus and method for controlling airflow through a personal computer, which is designed to satisfy the aforementioned needs, provide the previously stated objects, include the above-listed features, and achieve the already articulated advantages. The present invention is carried out with a "large fan-less" system, in a sense that the requirement for an increased volume of cooling air when a computer includes at least one higher heat-generating circuit board therein, is greatly reduced.

Accordingly, the present invention is a system and method for controlling airflow over circuit boards in a personal computer by including a parallel array of airflow-restricting plates beneath the circuit cards.

BRIEF DESCRIPTION OF THE DRAWINGS

The invention may be more fully understood by reading the following description of the preferred embodiments of the invention, in conjunction with the appended drawings wherein:

FIG. 3 is a cross-sectional plan view of the airflow metering apparatus taken along line 3—3 of FIG. 1.

DETAILED DESCRIPTION

Figure 1:
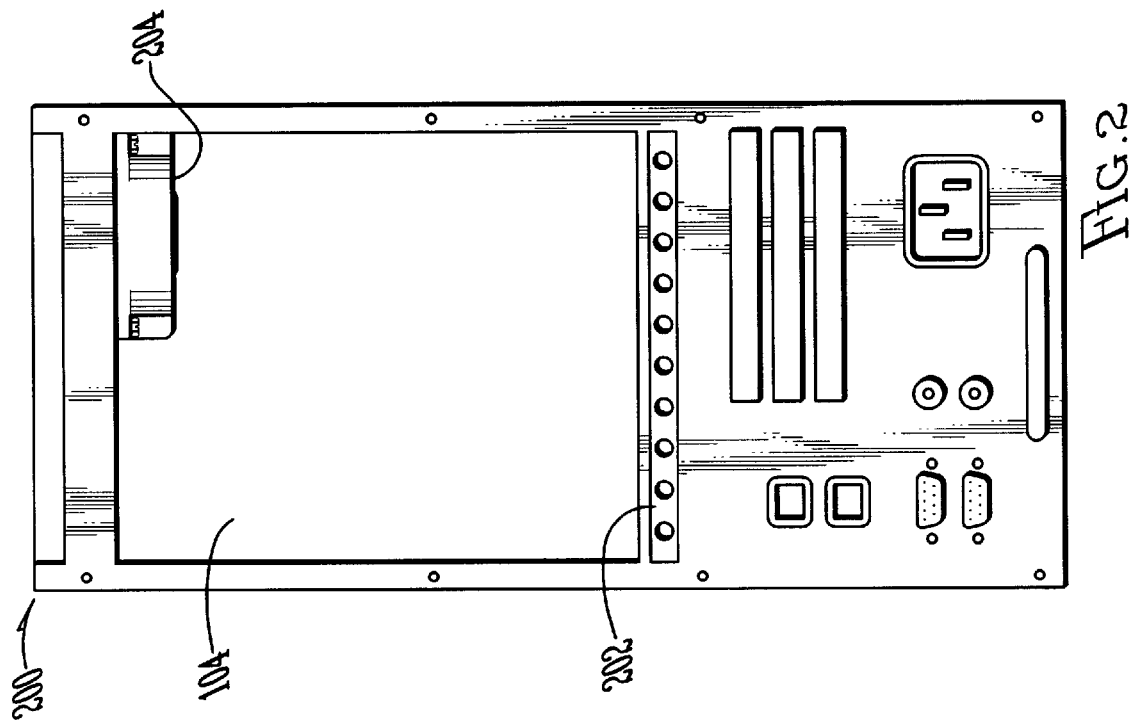
FIG. 1 is a front elevation view of a computer of the present invention.

Now referring to the drawings, wherein like numerals refer to like matter throughout, and more particularly to FIG. 1, there is shown a system of the present invention, having a front side generally designated 100, which includes a front side air intake opening 102, a PCI circuit card receiving area 104, having a plurality of circuit card receiving slots therein and a front removable access plate cover (not shown), a drive bay 106, and an extraction/insertion handle 108.

Figure 2:
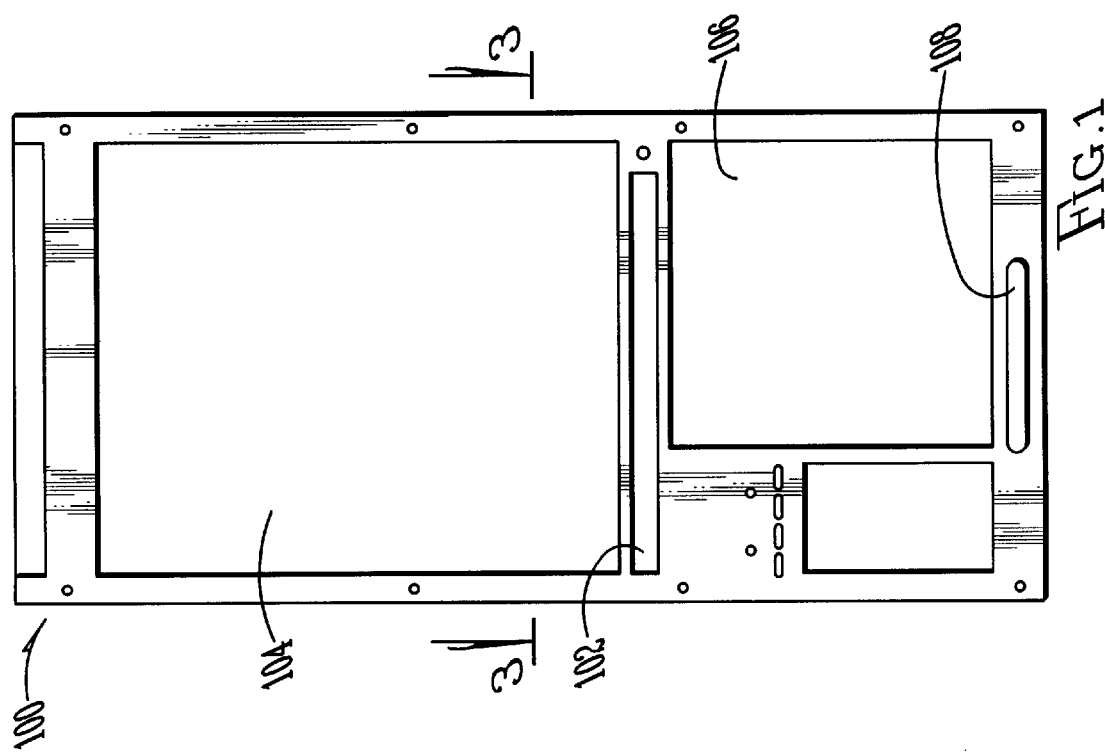
FIG. 2 is a rear elevation view of a computer of the present invention.

Now referring to FIG. 2, there is shown a back side generally designated 200 of the present invention, which includes a rear air intake opening 202 and a fan/air exhaust compartment 204, which could include a fan that exhausts air upwardly or rearwardly. In a reverse flow alternative, the fan 204 is an intake which blows air through the chassis and out the intake openings 102 and 202. Back side 200 includes a rear removable access plate cover (not shown) which is removed to allow access to the computer to insert circuit cards into circuit card receiving slots therein. The rear access plate cover, as well as the front access plate cover, are well known in the art and may be a single solid, non-air-permeable member or any other cover with differing characteristics, depending upon the particular requirements of a particular computer.

Now referring to FIG. 3, which is a cross-sectional plan view of the present invention, taken along a line 3—3 of FIG. 1 and looking down onto an array of a plurality of removable air-restricting panels, generally designated 300. This array would normally be disposed below the circuit card slot area of the computer. Removable air-restricting panels 300 include a first panel 302 generally extending from front side 100 to rear side 200. A first partial panel 304 and second partial panel 306 are also shown. Panel 304 has a series of relatively smaller air holes in comparison to those in second partial panel 306. Typically, an arrangement such as panels 304 and 306 would be used below a circuit card that had relatively high heat-generating capabilities for the rear of the card and relatively low heat-generating capabilities for the front of the card. Panel 308 is a solid panel which permits no air penetration therethrough. This may be frequently used where no card is located in a circuit card receiving slot immediately above. Panel 310 is shown partially slid into a panel receiving slot 311, to better demonstrate how these removable air-restricting panels may be inserted and removed. Panel 312 shows a dual line of air holes. Numerous other air hole configurations could be used as well for each of the panels. Panel 314 is partially slid into slot 315. Third partial panel 316 is shown adjacent to fourth partial panel 318. Slot 320 is shown with no panel therein, thereby providing maximum volume of airflow therethrough. Panels 322 and 324 are also shown.

In operation, and now referring to FIGS. 1–3, the present invention operates as follows:

The fan 204 expels air from within the chassis. This causes a reduction in pressure in the chassis, resulting in airflow into the chassis through front air intake opening 102 and rear air intake opening 202. This presumably cooler air then passes through the array 300 of removable air-restricting panels. The airflow is metered or controlled by the character of the panel disposed within a particular panel-receiving slot. The larger the air hole in the panel, the more airflow for cooling. Preferably, the airflow is controlled so that more air is allowed to flow over and about the circuit cards and portions thereof which have the highest heat generation. The air passes through the panels, then over the cards, thereby cooling them, and finally, the warmer air is exhausted by fan 204.

If a new card is placed in the computer, then a change in the array of removable air-restricting panels may be necessary, depending upon the heat generation characteristics of the new card with respect to the card which had occupied the card slot before; i.e. if a new card is exchanged into a circuit card slot where the new card has a higher heat-generation characteristic than the card previously disposed therein, then a new removable air-restricting panel should be used which has a larger open area through which cooling air may flow. This matching of airflow to heat generation would also be done preferably on a card segment-by-card segment basis, especially when areas of a particular card can have widely varying amounts of heat generation.

The circuit cards discussed herein are preferably compact PCI circuit cards, because it is believed that the benefits of the present invention will be readily appreciated when such cards are used.

It is thought that the method and apparatus of the present invention will be understood from the foregoing description, and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. A computer comprising:

a chassis having a front side, a rear side, a left side, a right side, a top, and a bottom;

a circuit card receiving area disposed in said chassis, for receiving therein a plurality of circuit cards, at least one having a predetermined heat-generating characteristic;

said front side having an air intake opening therein disposed at a point between said circuit card receiving area and above said bottom side;

a plurality of removable air-restricting panels disposed below said circuit card receiving area and above said air intake opening;

at least one of said air-restricting panels having a predetermined airflow characteristic;

said predetermined airflow characteristic of at least one of said air-restricting panels is responsive to an assessment of said predetermined heat-generating characteristic;

said plurality of circuit cards includes at least one compact PCI card;

said at least one of said air-restricting panels is disposed below said at least one compact PCI card;

a rear air intake opening disposed on said rear side below said circuit card receiving area;

an exhaust fan disposed above said front air intake opening and above said rear air intake opening, said exhaust fan for pulling cool air from outside said chassis, through said front air intake opening and said rear air intake opening, then through said plurality of removable air-restricting panels, then past said plurality of circuit cards, and then blowing the now warmer air outside the chassis;

said plurality of removable air-restricting panels is arranged in an array of parallel panel receiving areas;

at least one of said removable air-restricting panels has a first segment with a first segment airflow characteristic at a first end and a second segment having a different second segment airflow characteristic at a second end; and said first segment and said second segment are separate partial panels.

2. A computer comprising:

a chassis;

a plurality of compact PCI cards disposed in said chassis;

means for moving air through said chassis;

means for distributing airflow over said plurality of compact PCI cards as a function of predetermined heat characteristics of said compact PCI cards;

said means for distributing airflow includes a plurality of airflow-restricting panels;

said plurality of airflow-restricting panels is arranged in a parallel arrangement beneath said plurality of compact PCI cards; and said plurality of airflow-restricting panels includes at least two partial panels disposed in a single panel receiving slot, where said at least two partial panels each has a different airflow-restricting characteristic.

* * * * *